United States Patent [19]

Mochida

[11] Patent Number: 4,633,724

[45] Date of Patent: Jan. 6, 1987

[54] PUSH-PULL CABLE ARRANGEMENT FOR TRANSMITTING LONGITUDINAL MOTION

[75] Inventor: Haruo Mochida, Kanagawa, Japan

[73] Assignee: Nissan Motor Co., Ltd., Yokohama, Japan

[21] Appl. No.: 507,085

[22] Filed: Jun. 23, 1983

[30] Foreign Application Priority Data

Jul. 12, 1982 [JP] Japan ................................ 57-121520

[51] Int. Cl.$^4$ ............................ G05G 9/00; F16C 1/12
[52] U.S. Cl. .................................. 74/471 R; 74/501 R
[58] Field of Search .......... 74/501 R, 471 R, 471 XY, 74/501.5; 292/8, 28, 38, 50, 336.3; 403/287, 301

[56] References Cited

U.S. PATENT DOCUMENTS

| 2,480,083 | 8/1949 | McMillan | 74/471 |
|---|---|---|---|
| 4,331,353 | 5/1982 | Yazawa | 292/28 |
| 4,374,597 | 2/1983 | Mochida | 292/8 |

FOREIGN PATENT DOCUMENTS 0032378 7/1981 European Pat. Off. .
2039319 8/1980 United Kingdom .

Primary Examiner—Gary L. Smith
Attorney, Agent, or Firm—Schwartz, Jeffery, Schwaab, Mack, Blumenthal & Evans

[57] ABSTRACT

A push-pull cable arrangement for selectively transmitting longitudinal motion to two separate destinations has an inner wire having a front end, a rear end and an intermediate node between the front and the rear ends. The inner wire is enclosed with a first outer casing between the front end and the intermediate node, and with a second outer casing between the intermediate node and the rear end. Front and rear ends of the first outer casing are held stationary. A front end of the second outer casing facing the intermediate node of the inner wire is movable, and a rear end of the second outer casing facing the rear end of the inner wire is held stationary. When the front end of the inner wire is pulled, a longitudinal motion of the inner wire is transmitted to the rear end of the inner wire, by which a first receiving unit is moved. When the front end of the inner wire is pushed, the intermediate node of the inner wire pushes the front end of the second outer casing, by which a second receiving unit is moved.

5 Claims, 3 Drawing Figures

PUSH-PULL CABLE ARRANGEMENT FOR TRANSMITTING LONGITUDINAL MOTION

BACKGROUND OF THE INVENTION

The present invention relates to a so-called push-pull cable arrangement for selectively transmitting longitudinal motion to two separate destinations by pushing and pulling an inner wire enclosed in outer casings.

Such a push-pull cable arrangement of one type is disclosed in Japanese patent application No. 55-1621 or U.S. Pat. No. 4,374,597. In this push-pull cable arrangement, the inner wire has a front end, a rear end and an intermediate node between both ends. A first outer casing having a front end and a rear end encloses the inner wire between the front end and the intermediate node of the inner wire. A second outer casing having a front end and a rear end encloses the inner wire between the intermediate node and the rear end of the inner wire. The front end of the inner wire is connected with a hand lever for pushing and pulling the inner wire. The rear end of the inner wire is connected with a first receiving unit to be moved by the inner wire. The front end of the first outer casing is held stationary, and the rear end of the first outer casing is movable near the intermediate node of the inner wire. The front and rear ends are both held stationary. When the inner wire is pulled, the intermediate node of the inner wire is free to move longitudinally in such a pull direction, and the longitudinal motion of the inner wire in the pull direction is directly transmitted to the first receiving unit connected with the rear end of the inner wire. When the inner wire is pushed, the intermediate node is prevented from moving in such a push direction by a stationary stopper, so that the longitudinal motion of the inner wire in the push direction is not transmitted to the rear end of the inner wire. Instead, the rear end of the first outer casing moves away from the intermediate node toward the front end of the inner wire. This movement of the rear end of the first outer casing is transmitted by a swingable lever connected with the rear end of the first outer casing and a rod, to a second receiving unit. In this case, the first outer casing must bend somewhere in order to allow the rear end of the first outer casing to move away from the intermediate node of the inner wire.

This push-pull cable arrangement is useful especially to vehicles such as automobiles. This cable arrangement is used, in an automobile, for unlocking a fuel filler lid positioned near a rear wheel of the automobile, and a trunk lid in the rear of the automobile by a hand lever positioned near a driver's seat. In this application, this cable arrangement is undesirable because the first outer casing must bend, as mentioned above, between the driver's seat and the fuel filler lid in a narrow confined space in which many electrical wires and other cables must be disposed, together. Furthermore, a bend of the first outer casing decreases the efficiency of the push-pull cable arrangement in transmitting longitudinal motion.

SUMMARY OF THE INVENTION

It is an object of the present invention to provide a new push-pull cable arrangement for transmitting motion to two separate destinations.

It is another object of the present invention to provide a push-pull cable arrangement suitable to vehicles.

It is still another object of the present invention to provide a push-pull cable arrangement in which a required input effort is reduced.

According to the present invention, a push-pull cable arrangement for transmitting longitudinal motion comprises a wire, a first casing, a second casing, an input unit, an intermediate unit, link means, a first receiving unit and a second receiving unit. First, the wire has a front end, a rear end and an intermediate node between the front and rear ends. The first casing encloses the wire between the front end and the intermediate node, and has a front end and a rear end. The second casing encloses the wire between the intermediate node and the rear end, and has a front end and a rear end. The input unit has a stationary member to which the front end of the first casing is fixed, and a movable member connected with the front end of the wire and capable of pulling the wire from the first casing and pushing the wire into the first casing. The intermediate unit has a stationary member to which the rear end of the first casing is fixed, and which holds the intermediate node of the wire and allows the intermediate node to move longitudinally. The front end of the second casing abuts against the stationary member of the intermediate unit so as to prevent the distance between the rear end of the first casing and the front end of the second casing from decreasing when the wire is pulled. The intermediate node pushes the front end of the second casing and moves the front end of the second casing away from the stationary member of the intermediate unit when the wire is pushed. The link means is connected with the front end of the second casing and is caused to move in accordance with the movement of the front end of the second casing. The first receiving unit has a first member connected with the rear end of the wire, and a second member connected with the rear end of the second casing. The second receiving unit is connected with the link means.

In one embodiment of the present invention, the link means comprises a lever pivoted, at one end, on the stationary member of the intermediate unit and having a swingable end connected with the front end of the second casing. The second receiving unit comprises a rod having one end connected with the lever between the pivoted end and the swingable end.

Preferably, the second casing is more flexible than the first casing.

DETAILED DESCRIPTION OF THE INVENTION

Figure 1:
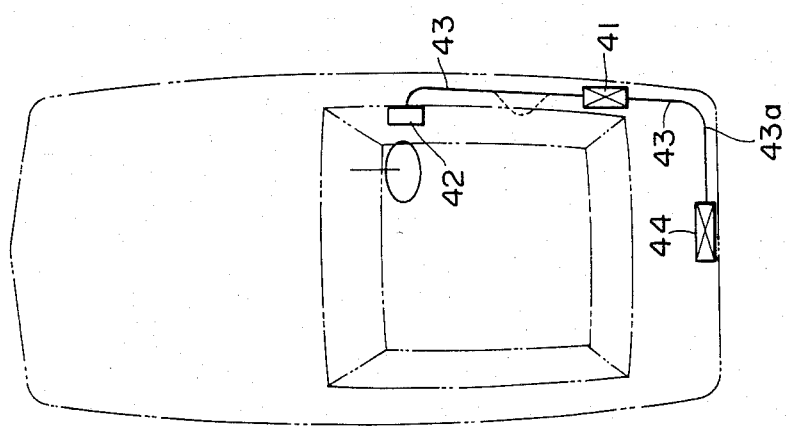
FIG. 1 is a schematic illustration showing a push-pull cable arrangement installed in an automobile.

FIG. 1 shows a push-pull cable arrangement installed in a vehicle. Near the driver's seat, there is provided an input unit 42. A reference numeral 41 is a fuel filler lid lock, and a reference numeral 44 is a trunk lid lock. A first outer casing 43 enclosing an inner wire, extends from the input unit 42 to the fuel filler lid lock 41, and a second outer casing 43 extends from the fuel filler lid lock 41 to the trunk lid lock 44. The second outer casing 43 can not reach the trunk lid lock 44 without bending t a portion 43a. In the conventional type push-pull able arrangement mentioned before, the first outer asing 43 must bend, as shown by a broken line in FIG. , between the input unit 42 near the driver's seat and 1e fuel filler lid lock 41. According to the present invention, the first outer casing 43 need not bend.

Figure 3:
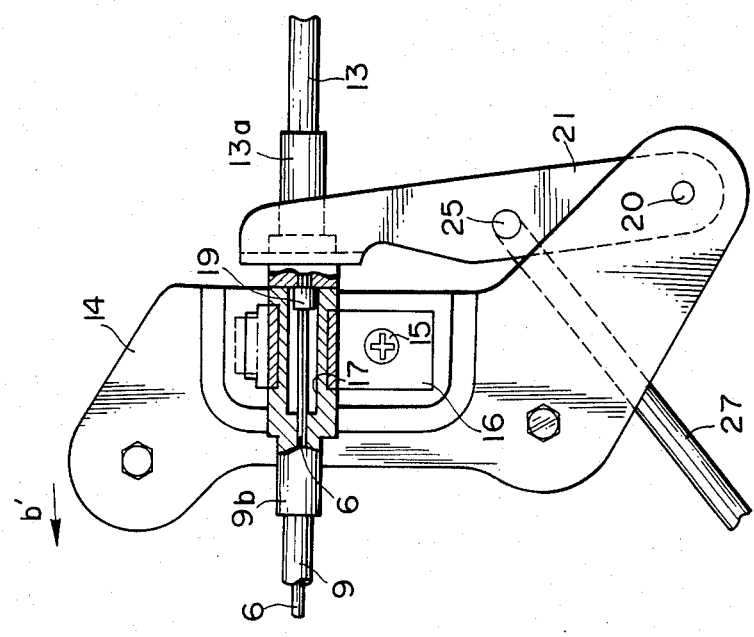
FIG. 3 is a enlarged sectional view of a portion of FIG. 2.
Figure 2:
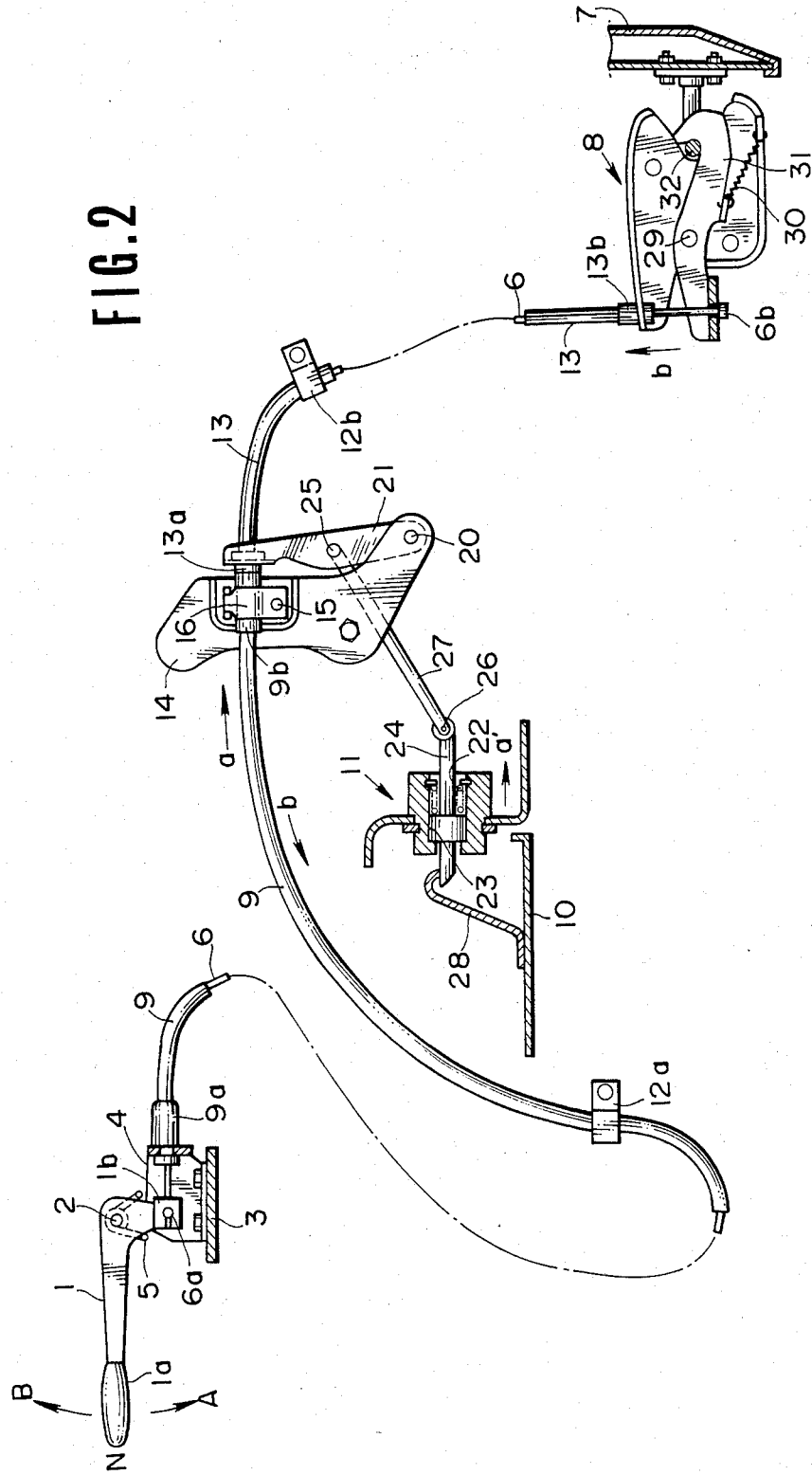
FIG. 2 is a schematic illustration showing one embodiment of the present invention applied to an automobile.

FIGS. 2 and 3 show one embodiment of the push-pullable arrangement according to the present invention.

A hand lever 1 of a L shape has a first arm 1a and a second arm 1b, and is pivoted, at a central corner, on a in 2 which is supported by a bracket 4 fastened to a ehicle body 3 near a driver's seat. Thus, the hand lever can swing on the pin 2 in two opposite directions from neutral position N shown in FIG. 1. The hand lever 1 is biased by a return spring 5 toward the neutral position.

An inner wire 6 has a first end 6a to which a bead is xed by staking or calking or other method, a second nd 6b to which a bead is fixed similarly, and an intermediate node 19 which lies between the first end 6a and 1e second end 6b and to which a bead is fixed similarly. The first end 6a of the inner wire 6 is connected with 1e second arm 1b of the hand lever 1 so that the inner /ire 6 can be pushed and pulled by the hand lever 1. The inner wire 6 extends from the hand lever 1 toward 1e rear of the vehicle, and the second end 6b is engaged /ith a first receiving unit, which is a lock mechanism 8 or a trunk lid 7, in this example. In some types of vehiles, the first output unit may be a lock mechanism for back door.

A flexible first outer casing 9 encloses the inner wire between the first end 6a and the intermediate node 19 1 such a manner that the inner wire 6 is slidable longitudinally in the first outer casing 9. A second outer casing 3 encloses the inner wire 6 between the intermediate ode 19 and the second end 6b. A first end 9a of the first uter casing 9 is fixed to the bracket 4, so that the first nd 9a is stationary. A second end 9b of the first outer asing 9 is fixed to a bracket 14 by a screw 15 and a lamp 16, so that the second end, too, is stationary. A lamp 12a supports the first outer casing 9 on the vehicle body, and a clamp 12b supports the second outer asing 13 slidably on the vehicle body.

The bracket 14 is fixed to the vehicle body near a second receiving unit which is disposed between the first and second ends of the inner wire 6. In this example, the second receiving unit is a lock mechanism 11 for fuel filler lid 10. The second end 9b of the first outer asing 9 abuts on a first end 13a of the second outer asing 13, and is formed with a bore 17 opening toward he first end 13a of the second outer casing 13. The bore 7 has a diameter greater than the diameter of the inner /ire 6, and receives therein the intermediate node 19 of he inner wire slidably. When the hand lever 1 is in the eutral position shown in FIG. 2, the intermediate node 9 abuts on the first end 13a of the second outer casing 3. When the inner wire 6 is pulled by the hand lever 1, he inner wire 6 slides longitudinally with respect to the irst outer casing 9 in a pull direction shown by an rrow b in FIG. 2, and the intermediate node 19 slides 1 the bore 17 away from the first end 13a of the second uter casing 13. When the hand lever 1 pushes the inner vire 6 into the first outer casing 9, the inner wire 6 1oves longitudinally in a push direction shown by an rrow a in FIG. 2, with respect to the first outer casing ', and the intermediate node 19 projects from the second end 9b of the first outer casing 9 by a length by which the first end 6a is pushed by the hand lever 1, and pushes the first end 13a of the second outer casing 13.

The first end 13a of the second outer casing 13 is movable, and is engaged with the lock mechanism 11 of the fuel filler lid 10. A second end 13b of the second outer casing 13 is fixed to the lock mechanism 8 of the trunk lid 7.

A lever 21 is pivotally supported, at one end, on the bracket 14 by a pin 20. A swingable end of the lever 21 is connected with the first end 13a of the second outer casing 13. The lock mechanism 11 of the fuel filler lid 10 has a locking rod 24 and a connecting rod 27. One end of the connecting rod 27 is pivotally connected with the lever 21 by a pin 25, and the other end of the connecting rod 27 is pivotally connected with one end of the locking rod 24 by a pin 26. The locking rod 24 is biased by a spring 22 toward a lock position, and the movement of the locking rod 24 is limited by a stopper portion 23. The other end of the locking rod 24 is engaged with a clamp 28 of the fuel filler lid 10.

The lock mechanism 8 of the trunk lid 7 has a latch lever 31, which is pivoted, in the middle, on a pin 29, and biased by a spring 30 toward a lock position. The inner wire 6 passes through one end of the latch lever 31, and the bead fixed to the second end 6b of the inner wire 6 abuts against the end of the latch lever 31. The other end of the latch lever 31 is engaged with a striker 32 integral with the trunk lid 7.

The thus constructed push-pull cable arrangement is operated as follows:

When the hand lever 1 is turned in a direction shown by an arrow B from its neutral position N in FIG. 2, the inner wire 6 moves longitudinally in the pull direction shown by the arrow b, and accordingly, the second end 6b turns the latch lever 31 against the spring 30. Thus, the latch lever 31 is released from the engagement with the striker 32, and the trunk lid 7 is unlocked, so that the trunk lid 7 opens by the aid of unshown spring mechanism (the reaction force of the weatherstrip). In this case, the intermediate node 19 of the inner wire 6 slides in the bore 17 in a direction shown by b' in FIG. 3. It is preferable that the bore 17 is so deep that the hand lever 1, even if it is turned to a maximum position, can not cause the intermediate node 19 to abut against the second end 9b of the first outer casing 9.

When the hand lever 1 is turned from the neutral position N in a direction shown by an arrow A in FIG. 2, the inner wire 6 moves longitudinally in the push direction shown by the arrow a. During this movement, the intermediate node 19 pushes the first end 13a of the second outer casing 13, and causes the second outer casing 13 to bend and the first end 13a to move rightwards in FIGS. 2 and 3. With this movement, the lever 21 connected with the first end 13a of the second outer casing 13 rotates in a clockwise direction, and thus, disengages the locking rod 24 from the clamp 28 of the fuel filler lid 10 by moving the locking rod 24 in a direction a' through the connecting rod 27 against the spring 22. The fuel filler lid 10 opens by the aid of a spring mechanism or a cylinder mechanism. In this case, the inner wire 6 does not move relative to the second outer casing 13, and no motion is transmitted through the second outer casing 13. Therefore, the second outer casing can be a spiral wire casing having a greater capability in being bent when it is pushed, than that of the first outer casing. Furthermore, the required input effort applied to the hand lever 1 for moving the inner wire 6 is reduced.

The first outer casing 9 of this push-pull cable arrangement need not bend, as shown by a solid line in FIG. 1, so that the first outer casing is less obstructive when installed in a vehicle. This push-pull cable arrangement is suitable especially for vehicles in which the second outer casing is necessarily bent as shown by 43a in FIG. 1. In this push-pull cable arrangement, the required input effort applied on the hand lever to move the inner wire is reduced because there is no need to bend the first outer casing. According to the present invention, the second outer casing can be more flexible than the first outer casing, and in this case, the required input effort is further reduced, and the manufacturing cost of the arrangement is reduced.

What is claimed is:

1. A push-pull cable arrangement for transmitting longitudinal motion, comprising
   a wire having a front end, a rear end and an intermediate node between the front and rear ends,
   a first casing enclosing the wire between the front end and the intermediate node, and having a front end and a rear end,
   a second casing enclosing the wire between the intermediate node and the rear end, and having a front end and a rear end,
   an input unit having a stationary member to which the front end of the first casing is fixed, and a movable member connected with the front end of the wire and capable of pulling the wire from the first casing and pushing the wire into the first casing,
   an intermediate unit having a stationary member to which the rear end of the first casing is fixed, and which holds the intermediate node and allows the intermediate node to move longitudinally, the front end of the second casing abutting against, the stationary member of the intermediate unit so as to prevent the distance between the rear end of the first casing and the front end of the second casing from decreasing when the wire is pulled, the intermediate node pushing the front end of the second casing and moving the front end of the second casing away from the stationary member of the intermediate unit when the wire is pushed,
   link means connected with the front end of the second casing and caused to move in accordance with the movement of the front end of the second casing,
   a first receiving unit having a first member connected with the rear end of the wire, and a second member connected with the rear end of the second casing,
   a second receiving unit connected with the link means.

2. The push-pull cable arrangement according to claim 1, wherein the link means comprises a lever pivoted, at one end, on the stationary member of the intermediate unit and having a swingable end connected with the front end of the second outer casing.

3. The push-pull cable arrangement according to claim 1, wherein the second receiving unit comprises a rod having one end connected with the lever between the swingable end and the pivoted end.

4. The push-pull cable arrangement according to claim 3, wherein the second member of the first receiving unit is stationary, and the rear end of the second casing is fixed to the second member of the first receiving unit.

5. The push-pull cable arrangement according to claim 4, wherein the second casing has a greater capability of being bent when it is pushed than that of the first casing.

* * * * *